(12) United States Patent
Chowdhury et al.

(10) Patent No.: US 7,005,076 B2
(45) Date of Patent: Feb. 28, 2006

(54) CAUSTIC SOLUTION TREATMENT PROCESS

(75) Inventors: Ajit K. Chowdhury, Madison, WI (US); Sarah Wilk, Green Bay, WI (US)

(73) Assignee: RMT, Inc., Madison, WI (US)

( * ) Notice: Subject to any disclaimer, the term of this patent is extended or adjusted under 35 U.S.C. 154(b) by 189 days.

(21) Appl. No.: 10/456,096

(22) Filed: Jun. 6, 2003

(65) Prior Publication Data

US 2004/0245188 A1    Dec. 9, 2004

(51) Int. Cl.
  *C02F 1/72*    (2006.01)
(52) U.S. Cl. .................................. 210/758; 423/206.1
(58) Field of Classification Search ............... 210/758, 210/188; 423/206.1
  See application file for complete search history.

(56) References Cited

U.S. PATENT DOCUMENTS

| | | | |
|---|---|---|---|
| 4,350,599 A * | 9/1982 | Chowdhury | ................ 210/761 |
| 5,244,576 A | 9/1993 | DeRoeck et al. | |
| 5,268,104 A | 12/1993 | Masoomain | |
| 5,298,174 A | 3/1994 | Momont et al. | |
| 5,354,482 A | 10/1994 | Varadi | |
| 5,368,726 A * | 11/1994 | Masoomian | ................ 210/188 |
| 5,395,517 A * | 3/1995 | Varadi | ........................ 210/104 |
| 5,434,329 A | 7/1995 | Lehr | |
| 5,675,055 A | 10/1997 | Evans et al. | |
| 6,033,576 A * | 3/2000 | Russo | ........................ 210/704 |
| 6,210,583 B1 * | 4/2001 | Kurukchi et al. | ........... 210/638 |
| 6,576,144 B1 * | 6/2003 | Vineyard | ..................... 210/758 |

OTHER PUBLICATIONS

European Environment Agency, "Indicator: Biochemical Oxygen Demand in Rivers [2001]" Press Release.
Fire Service Plus, "Hi-Tec Chemical technology for Fire Fighting in the 21st Century," Press Release.

* cited by examiner

*Primary Examiner*—Betsey Morrison Hoey
(74) *Attorney, Agent, or Firm*—Quarles & Brady LLP

(57) ABSTRACT

A method for treating a spent caustic solution having a pH greater than about 10.5 includes the steps of (a) lowering the pH of the caustic solution into the range of between about 10 to 10.5 to produce a pH-modified caustic solution; (b) oxidizing the pH-modified caustic solution until the solution to produce a non-sulfide reactive oxidized solution; and (c) lowering the pH of the oxidized solution to a pH less than 9.

8 Claims, 1 Drawing Sheet

CAUSTIC SOLUTION TREATMENT PROCESS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

In the petroleum and petrochemical industries, acid gases containing $CO_2$, $H_2S$, and VOCs are commonly scrubbed with aqueous caustic solutions that can contain, for example, NaOH. Such scrubbing processes yield a hazardous spent caustic solution having a high pH, typically greater than 10.5, and sulfide reactivity. Spent caustic solutions are also characterized by high chemical oxygen demand (COD) and biochemical oxygen demand (BOD). BOD and COD are measures of oxygen uptake by water arising from chemical and biodegradable agents in the water. The COD and BOD exerting compounds in spent caustic solutions can include, but are not limited to sodium sulfide ($Na_2S$) sodium hydrosulfide, and various organic compounds, including naphthenic acids and the like.

Typically, sulfides in the spent caustic solutions are oxidized using a gaseous oxidant such as air or oxygen to convert the sulfides into thiosulfates and sulfates which can be subsequently neutralized using acid. Unfortunately, conventional oxidation can result in severe foaming problems, rendering the air oxidation process inoperable without expensive defoaming chemicals. Conventional efforts to control pH before oxidation by, e.g., adding sulfuric acid, undesirably evolves hydrogen sulfide gas.

The art is in need of alternative methods for treating spent caustic solutions to avoid foaming and hydrogen sulfide evolution while yielding a waste discharge stream having reduced BOD and COD. It is also desirable to reduce the amount of organic matter present in treated discharge streams.

BRIEF SUMMARY OF THE INVENTION

The present invention is summarized in that the problems encountered in the prior art are overcome in a method for treating a spent caustic solution having a pH greater than 10.5 includes the steps of lowering the solution pH to about 10.5 using carbon dioxide, oxidizing the pH-adjusted solution until non-sulfide reactive in a US EPA sulfide reactivity test, then further lowering the pH of the oxidized solution to less than about 9.0.

It is an advantage of the present invention that the initial lowering of the pH permits oxidation without foaming.

It is another advantage of the present invention that the initial lowering of the pH with carbon dioxide does not result in evolution of $H_2S$ gas.

It is yet another advantage of the invention that after treatment according to the method, the treated spent caustic solution has substantially lower BOD and COD as a result of lower sulfidic oxygen demand.

It is yet another advantage of the invention that the final treated spent caustic solution is not sulfide reactive.

In a related embodiment, a method is provided for removing oily organic matter that can separate from the spent caustic solution during neutralization before or after oxidation, when the pH of the solution falls in the range of about 9.5 to about 10.5. When this occurs, oily organic matter separates from and floats on the organic phase. In accord with the preferred embodiment, the floating oily organic matter can be removed, thereby further lowering the COD and BOD of the spent caustic solution.

Further, solids that can precipitate during oxidation and lowering of the pH can also be filtered to generate a final discharge stream having low levels (about 20 mg/liter or less) of suspended solids.

Finally, VOCs stripped from the solution during oxidation can be removed by, passing the solution through a granular activated carbon bed or by burning.

It is another advantage of the present invention that it can be practiced at ambient temperature and pressure.

Other objects, features, and advantages of the present invention will become apparent upon consideration of the following detailed description.

DETAILED DESCRIPTION OF THE INVENTION

Figure 1:
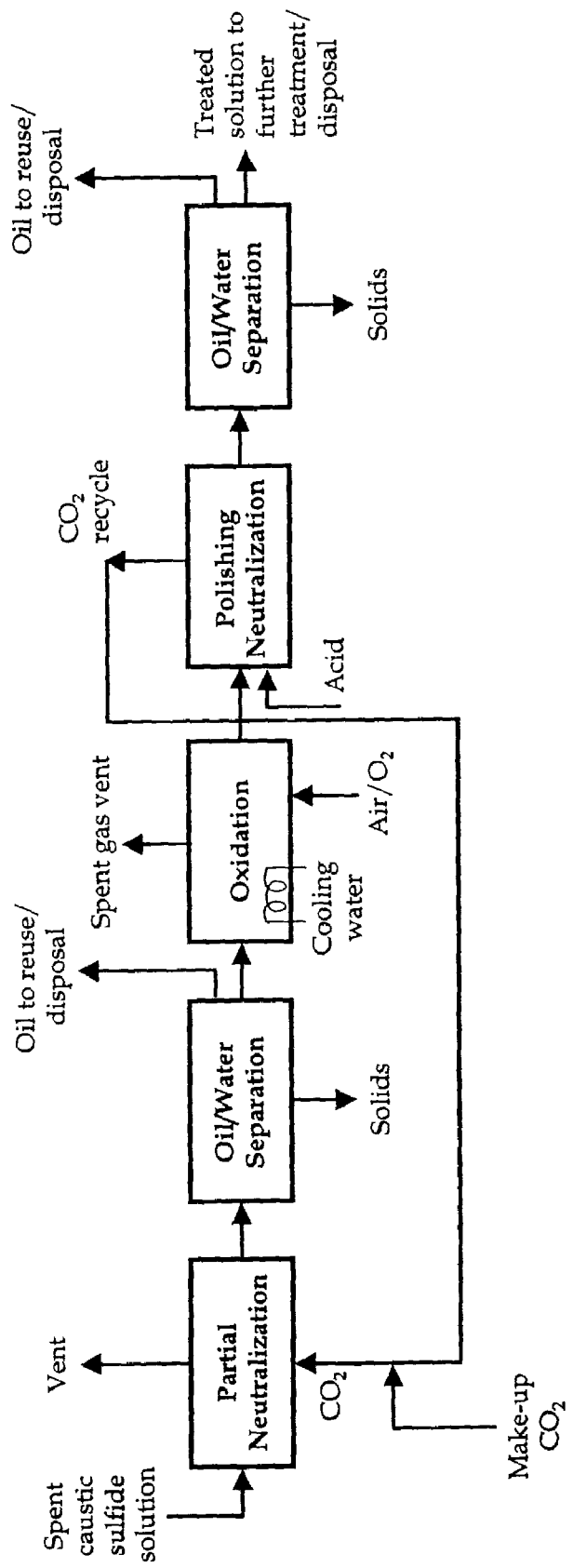
FIG. 1 is a schematic depiction of one embodiment of a process according to the present invention.

In accord with the present invention, a spent caustic solution is first partially neutralized using an acidic gas, preferably a weak-acid gas, such as carbon dioxide, to a pH in the range of approximately 10 to 10.5. Alternatively, acid gasses, such as sulfur dioxide, hydrogen sulfide, and the like may also be used. Liquid acids, such as HCl and $H_2SO_4$ are not suited for use at this stage because of the potential on mixing for localized low pH hot spots that can increase the potential for generating gaseous $H_2S$.

During this partial neutralization stage, evolved gas can be vented from the system.

After partial neutralization, the pH-lowered solution is oxidized at ambient temperature and pressure to substantially reduce the sulfidic oxygen demand of the solution, while also lowering the pH by removing its sulfidic alkalinity. At the same time, the solution is rendered non-sulfide reactive, as determined by the US EPA Hazardous Waste Toxicity Characteristic for Sulfide Reactivity. The oxidation step can use oxygen, ozone, air, and air enriched with oxygen. The use of enriched air or pure oxygen reduces or eliminates gaseous discharge from the treatment system, thereby minimizing the emission control requirements. However, when air is used, organic compounds stripped from the caustic solution may be scrubbed in an oxidizing solution (containing, e.g., $H_2O_2$) or adsorbed in a granular activated carbon bed, or sent to flare for combustion.

After oxidation, further pH control is undertaken as needed to lower the solution pH to desirable levels below about 9.0. The post-oxidation pH control can be accomplished by contacting the solution with additional $CO_2$ or other acid gases, or with strong mineral acids such as $H_2SO_4$, $H_3PO_4$, HCl, $HNO_3$ and the like. Addition of a strong acid will liberate carbon dioxide added during the initial partial neutralization step. The liberated $CO_2$ can be reused in subsequent initial partial neutralization.

During the pH control steps before or after oxidation, a substantial amount of oily organic matter can separate from the aqueous phase at a pH in the range of approximately 9.5 to 10.5. Preferably, the floating oily organics are removed from the waste to further reduce the COD and BOD of the treated waste. Precipitated solids generated during oxidation and neutralization can also be filtered to generate a low-suspended solids waste discharge stream.

EXAMPLE

A spent caustic solution was treated with gaseous $CO_2$ in a bench-scale laboratory treatability study at various levels of pH control. The spent caustic solution was characterized as follows:

| | |
|---|---|
| pH | 13.9 |
| Sulfide | 110 g/L as $Na_2O$ |
| Sodium | 4.9 weight % |
| Acid Oils | 5 weight % |
| Specific gravity | 1.099 |

The following results were obtained:

| | NO $CO_2$ BUBBLING | NEUTRALIZATION TO pH~10 | NEUTRALIZATION TO pH < 9.5 |
|---|---|---|---|
| pH | 13.9 | 10.1 | 9.3 |
| $H_2S$ present in head space (measured by Draeger tube) | No | No | Yes |
| Foaming during oxidation With air bubbling | Yes | No | — |

Neutralization of the spent caustic solution with dilute $H_2SO_4$ was characterized by the presence of $H_2S$ in the head space.

The COD of the spent caustic solution aqueous layer measured by HACH method at various levels of treatment were as follows:

| Treatment level | Screening COD (mg/L) |
|---|---|
| Untreated | 147,000 |
| Neutralization (Step 1) with $CO_2$ to pH 9.8–10 | 72,900 |
| Separation of oily layer (Step 2) with air oxidation of Aqueous layer (Step 3) which was filtered after oxidation | 35,700 |
| Acidification with $H_2SO_4$ to pH < 9.0 (Step 4), remove oily Layer, filter aqueous layer | 18,300 |

The acidification of the air oxidized solution in Step 4 showed no presence of $H_2S$ in the head space.

We claim:

1. A method for treating a spent caustic solution having a pH greater than about 10.5, the method comprising:
   (a) lowering the pH of the caustic solution into the range of between about 10 to 10.5 to produce a pH-modified caustic solution;
   (b) oxidizing the pH-modified caustic solution to produce a non-sulfide reactive oxidized solution; and
   (c) lowering the pH of the oxidized solution to a pH less than 9, wherein steps (a), (b) and (c) are performed at ambient temperature.

2. The method of claim 1 further comprising the step of removing a non-aqueous phase from a solution produced in either pH-lowering step.

3. The method of claim 1 wherein either pH-lowering step comprises the step of exposing the caustic solution or the oxidized solution to an acidic gas selected from the group consisting of $CO_2$, $SO_2$ and HCl.

4. The method of claim 1 wherein the step of lowering the pH of the oxidized solution comprises the step of exposing the oxidized solution to a mineral acid selected from the group consisting of $H_2SO_4$, HCl, $H_3PO_4$, and $HNO_3$.

5. The method of claim 1 wherein the step of oxidizing the pH-modified caustic solution comprises the step of exposing the pH-modified caustic solution to an oxidizing agent selected from the group consisting of oxygen, ozone, air, and air enriched with oxygen.

6. The method of claim 1 wherein the oxidation step and the second pH-lowering step are performed simultaneously.

7. The method of claim 1 wherein the second pH-lowering step liberates carbon dioxide, the method further comprising the step of treating additional spent caustic solution with the liberated carbon dioxide.

8. A method for treating a spent caustic solution having a pH greater than about 10.5, the method comprising:
   (a) lowering the pH of the caustic solution into the range of between about 10 to 10.5 to produce a pH-modified caustic solution;
   (b) oxidizing the pH-modified caustic solution to produce a non-sulfide reactive oxidized solution; and
   (c) lowering the pH of the oxidized solution to a pH less than 9,
   wherein the second pH-lowering step liberates carbon dioxide, the method further comprising the step of treating additional spent caustic solution with the liberated carbon dioxide.

* * * * *